United States Patent [19]

Hübner et al.

[11] Patent Number: 4,925,884
[45] Date of Patent: May 15, 1990

[54] PROCESS FOR THE PRODUCTION OF CONCENTRATED EMULSION POLYMERS

[75] Inventors: Wolfgang Hübner, Kempen; Otto Schroers, Krefeld, both of Fed. Rep. of Germany

[73] Assignee: Chemische Fabrik Stockhausen GMBH, Krefeld, Fed. Rep. of Germany

[21] Appl. No.: 26,367
[22] PCT Filed: Jun. 19, 1986
[86] PCT No.: PCT/EP86/00362
§ 371 Date: Feb. 13, 1987
§ 102(e) Date: Feb. 13, 1987
[87] PCT Pub. No.: WO86/07596
PCT Pub. Date: Dec. 31, 1986

[30] Foreign Application Priority Data

Jun. 22, 1985 [DE] Fed. Rep. of Germany ....... 3544419

[51] Int. Cl.$^5$ ................................................ C08K 3/20
[52] U.S. Cl. .................................... 523/340; 523/337; 523/339; 524/801
[58] Field of Search ................ 523/340, 337, 339; 524/801

[56] References Cited

U.S. PATENT DOCUMENTS 4,021,399 5/1977 Hunter et al. ...................... 523/340
4,037,040 7/1977 Trapasso et al. .
4,154,910 5/1979 Tanaka et al. ...................... 521/63

FOREIGN PATENT DOCUMENTS 551227  3/1983  Australia .
560288  4/1984  Australia .
563010  9/1984  Australia .
565834 11/1984  Australia .
2064101 7/1972  Fed. Rep. of Germany .

OTHER PUBLICATIONS

Chemical Abstracts, vol. 88, No. 14, Apr. 3, 1978, p. 29, Abstract 90451s.

Primary Examiner—Joseph L. Schofer
Assistant Examiner—Peter Mulcahy
Attorney, Agent, or Firm—Sprung, Horn, Kramer & Woods

[57] ABSTRACT

The present invention relates to a process for the production of concentrated, water-soluble or water swellable emulsion polymers by the polymerisation of at least one water-soluble monomer in a water-in-oil dispersion by means of polymerisation initiators, preferably in presence of bi- or multi-function vinyl- or allyl compounds in which a water-in-oil dispersion of the starting monomers is polymerized while being stirred so that the heat of polymerisation is eliminated by distillation removal of the water contained in the reaction mixture. The polymerisation temperature is preferably adjusted and controlled by means of the pressure in the system.

7 Claims, No Drawings

PROCESS FOR THE PRODUCTION OF CONCENTRATED EMULSION POLYMERS

Polyelectrolytes in the form of liquid dispersions, designated as emulsion polymers, are used in technology, in water and waste-water processing and in various manufacturing processes as flocculating, water-removal, and retention aids, as viscosity-intensifying additives in exploration and crude oil extraction, in the production of textiles, and, more recently, in cosmetic preparations As described in DE-PS No. 1089173 the production of emulsion polymers takes place by the radical polymerisation of water-soluble monomers. Preferably acrylamide and other acrylic acid derivatives that are contained in the disperse, aqueous phase of finely divided water-in-oil emulsions.

These products are economically produced if the polymer fraction in the product (dissolved in water) possesses the required effectiveness in its intended application, and if the polymer fractions within the product, apart from the non-effective portions (the hydrophobic phase formed from the liquid hydrocarbons and emulsifiers and water), is sufficiently high For this reason, it is desirable to prepare emulsion polymers that are as highly concentrated as possible.

During the production of the emulsion polymers the concentration of the polymer portion is determined—in addition to the solubility of the monomers—by the fact that the radical polymerisation of the quoted monomers is a rapid, strongly exothermic process, so that the reaction heat that is generated in proportion to the concentration of the monomers and to the speed of polymerisation has to be eliminated. In addition to the known monomer-supply process, several other production methods are described as solutions to this problem. U.S. Pat. No. 3,767,629 proposes the inhibition of polymerisation by a sporadic air supply to the monomer emulsion as a means of controlling the course of polymerisation. DE-OS No. 28 11 422 proposes a reduction of the speed of polymerisation by the addition of heavy-metal ions in the monomer phase. However, all of these processes entail the disadvantage that the polymerisation reaction is very often too strongly inhibited, so that polymerisation as a whole is impaired and the quality of the polymers does not reach the optimal possible level.

According to U.S. Pat. No. 4,070,321, the reaction is controlled by adjusting the pH value of the monomer phase for producing high-molecular anionic polymers. However, regulation of polymerisation by way of the pH value of the aqueous phase is inadequate for the production of concentrated products.

It is already known that work can be carried on in two stages in order to produce concentrated products.

In the first stage, low-concentrated products are produced by the adiabatic process, and in the second stage an increase in the polymer content is achieved by distillation with the renewed addition of heat, optionally with the addition of hydrocarbons distilled azeotropically, by the separation of water and with a small proportion of the hydrocarbons (U.S. Pat. Nos. 4,021,399 and 4,090,992). However, this process entails additional expenditures of energy and time. Furthermore, the polymers have to be stabilized by special additives (U.S. Pat. No. 3,507,840), in order that they retain their effectiveness for technical applications for a longer period of time. In addition, it is also known that the polymerisation heat can be eliminated by distillate reflux cooling at low pressure (DD-PS No. 145 401 and U.S. Pat. No. 4,078,133). This process entails the disadvantage that the refluxing free quantity of water can lead to inhomogeneity in the water-in-oil polymer dispersion and dilute the polymer portion that is effective in the product.

The technique of concentration by means of azeotropic distillation of prepared polymer dispersions has been improved recently by DE-OS No. 3224994, in particular by suitable changes in the apparatus used but without the elimination of the disadvantages inherent in such a two-stage process.

Proceeding from the preceding described prior art it is an object of the present invention to create a process with which emulsion polymers with a high polymer content of high quality can be produced in one process step.

According to the present disclosure this object is achieved by special management of the polymerisation, by which both control of the speed of the radical polymerisation of the water-soluble monomers in the water-in-oil emulsion as well as an increase in the polymer concentration in the end product is achieved.

Thus, here described is a process for the production of concentrated emulsion polymers by the polymerisation of at least one water-soluble monomer in a water-in-oil dispersion by means of polymerisation initiators, preferably in the presence of bi- or multifunctional vinyl or allyl compounds, this being characterized in that a water-in-oil dispersion of the starting monomers is polymerized whilst being stirred such that the polymerisation heat is eliminated by the distillative removal of the water contained in the reaction mixture.

The fact that by using the mode of operation according to the present disclosure it is possible, starting from water-in-oil monomer emulsions, to control the polymerisation and at the same time separate a mixture consisting of water and, preferably, small fractions of the liquid hydrocarbons of the emulsion as a distillate, without destroying the monomer or polymer dispersion or changing the proportions during polymerisation by removal of the component water, without prejudicing the quality of the product, must be regarded as surprising. The polymerisation temperature is adjusted or controlled by the prevailing pressure in the reaction vessel.

It is preferred that the pressure in the reaction system be so adjusted that the polymerisation temperature lies in the range of 20°-70°, preferably 30°-50° C. The polymerisation takes place at a reduced pressure, preferably in the range of 10-150 mbar. According to a further embodiment, polymerisation takes place under at least approximately isothermic conditions. However, according to a further embodiment of the present invention it can take place in a first phase almost isothermically at lower temperatures in the range of 30° C. to 50° C., and then either approximately isothermically at higher temperatures of 50° C. to 80° C., preferably 50° to 70° C. or be concluded under adiabatic conditions. Polymerisation under adiabatic conditions can then occur if the polymerisation has progressed to the point that the polymerisation heat that is liberated for a brief period does not lead to the batch being heated to the boiling point of the dispersion (monomer emulsion and emulsion polymer). Polymerisation under adiabatic conditions is precluded if high temperatures during polymerisation have a negative influence on the characteristics of the product.

The emulsion of the starting monomers is formed in the known manner from the aqueous monomer solution and the hydrophobic phase. When this is done, the monomer concentration in the aqueous solution is so selected that high polymer fractions are obtained in the end product and the stability of the dispersion is retained in all phases of production. According to the present disclosure it is possible to start from concentrated monomer solutions. Typical concentrations lie in the range of 40–80%-wt. However, it is possible to start from solutions at lower concentrations that are then concentrated to form concentrated polymer dispersions in the course of the process described. This method of proceeding makes it possible to use economical raw materials in the form of low-concentration monomer solutions. Typical concentrations of such low concentration monomer solutions lie in the range of 15–40%, preferably from 30–40%.

Water-soluble, radically polymerizable compounds are suitable as monomers. Examples of non-ionogenic monomers are acryl- and methacrylamide, the hydroxyalkyl esters of the acryl- or methacrylic acid, preferably 2-hydroxyethyl- and 2-hydroxypropyl ester, vinyl pyrrolidon and N-vinyl acetamide. Examples of anionic monomers are $\alpha$-$\beta$-unsaturated mono- and/or dicarboxylic acids, such as acrylic, methacrylic, itaconic, maleic and fumaric acids, their water-soluble salts, vinyl sulfonic acid, acrylamide alkane sulfonic acids, phenylvinyl phosphonic acids and their salts. Cationically effective monomers are amino-alkyl esters and amino alkylamides of unsaturated radically polymerizable carboxylic acids, for example 2-dimethyl- or 2-dietyl-aminoethyl-, 2-dimethyl-aminopropyl-, 4-dimethylaminobutyl-, 3-dimethyl-aminoneopentyl, morpholinoethyl- and piperidinethyl ester of the acryl- or methacrylic acid as well as vinylpyridin, vinylimadazol, vinylimidazolin, and vinylimidazolidine, as well as their quaternary products and salts.

Fractions of monomers which are water-soluble either only slightly or not at all are usable if the monomer mixture as a whole remains water-soluble.

Bi- or multifunctional vinyl or allyl compounds, for example, methylene bisacrylamide can be used to produce polymer dispersions that are insoluble in water but which can however swell in water.

As a basis for the hydrophobic phase it is possible to use paraffinic, isoparaffinic, naphthenic, and aromatic liquid hydrocarbons, optionally their halogenized derivatives, e.g., n-paraffins as well as mixtures of the quoted hydrocarbons, amongst others. Preferably, sorbitane fatty-acid esters, and glycerine fatty-acid esters are used as emulsifiers to form the water-in-oil emulsion, although, however, other water-in-oil emulsifiers, for example, according to DE-OS No.2455 287 emulsifiers that can be produced from fatty alcohol glycidyl ethers with polyvalent alcohols can be used. Furthermore, the stability of the monomer emulsion can be achieved by combining water-in-oil emulsifiers with oil-in-water emulsifiers, for example, of sorbitane monooleate with ethoxylized fatty acids or fatty alcohols as is cited in DE-OS No. 23 33 927. The water-in-oil emulsion formed from the components is optionally homogenized by a separate process until a specific viscosity number of the emulsion has been achieved.

A container that is suitable for the polymerisation process is provided with a stirring mechanism, a distillation stage, and a cooler as well as with gas supply lines, an immersion tube, with a temperature sensor and a suitable indicator as well as a pressure indicator.

Prior to polymerisation the emulsion is washed with an inert gas, e.g., with nitrogen or carbon dioxide, so as to remove the oxygen. The oxygen can also be removed by repeated evacuation and rinsing of the emulsion with nitrogen.

Polymerisation can be started with the known radical initiators, by heating the monomer emulsion, e.g., with 2,2-azoisobutyrodinitrile, 2,2-azo-bis-(2-amidineopropane) dichloride, 4,4-azo-bis-(4-cyanvaleric acid), peroxocarbonates, and peroxides such as tert-butylhydroperoxide, dibenzoyl peroxide, and persulfates such as potassium peroxide disulfate.

Proceeding from monomer emulsions at room temperature or in the cooled state, polymerisation can be initiated by the addition of a redox system as a starter, e.g., by the addition of aqueous solutions of sodium dithionite and potassium peroxide sulfate. When this is done, the monomer emulsion is heated by the exothermic polymerisation and polymerisation is continued by the thermal decomposition of a second starter in the emulsion.

The desired polymerisation temperature in the range of 20°–70° C. is adjusted or controlled by the pressure in the polymerisation vessel. Once the polymerisation vessel has been evacuated polymerisation is started at the appropriate low pressure and continued, in which connection pressures in the range of 10–150 mbar have been found to be advantageous. The polymerisation temperature or pressure in the reaction system are so selected that polymerisation takes place at sufficient reaction speed. With the start of polymerisation the partial vapour pressure of the water and the liquid hydrocarbons increases above the monomer emulsion. When the low pressure that has been selected is reached the water begins to distill off from the polymerizing emulsion. In order to maintain the desired low pressure within the reaction vessel the water vapour is drawn off through an effective cooling system and condensed in a receiver, preferably together with small fractions of the liquid hydrocarbons. In this way, the heat that is liberated during polymerisation is eliminated from the system. At the same time, the concentration of the resulting polymer dispersion is increased by the separation of the distillate.

If needs be, polymerisation can also be influenced by known measures such as external cooling, inhibition by air injection, etc. After the removal of atmospheric oxygen that has been introduced in limited quantities, by the renewed application of the vacuum, polymerisation proceeds automatically, i.e., without the renewed addition of a starter.

If no other measures for heat exchange are carried out during distillation, the reaction yield can be controlled quite simply on the basis of the quantity of distillate. The reaction is concluded with the cessation of the heat tone and distillation.

The distillate can be divided into water and preferably small fractions of liquid hydrocarbons both of which can be reused as raw material. If 2,2-azoisobutyro dinitrile is used as a starter before being used again the distillate must be filtered so as to cleanse it of fractions of this substance, which make the transition with the steam during distillation.

In the process according to the present disclosure stable emulsion polymers with a high polymer content are produced in one process stage by polymerisation of water-soluble monomers in the form of the water-in-oil emulsion; in this stage the polymerisation heat is used as vapourizing heat to distill off the water from the reaction system during polymerisation. In contrast to processes known up to the present time and used to produce water-soluble polymerisation products no additional thermal energy is used to boost the concentration.

This process permits the use of inexpensive raw materials in the form of low concentration solutions of the monomers to produce concentrated polymer dispersions.

In this process, the control of polymerisation by the selection of suitable temperature and pressure conditions, and the effective removal of polymerisation heat permits the large scale production of polymers that are extremely effective from the point of view of technical applications and which are particularly well suited, amongst other things, as flocculating, retention and de-watering agents as well as additives to flood water during the extraction of crude oil.

Most surprising, it was found that, according to the present disclosure, very effective polymerisation was achieved by stirring, particularly by stirring with a high level of turbulence, without there being any interruption in the reaction. In contrast to this, in other processes, e.g., as in DE-OS No. 32 07 113, brisk stirring is a disadvantage since it causes the polymerisation reaction to break down.

EXAMPLE 1

The reaction vessel is provided with a stirrer, a thermometer, a descending cooler, a vacuum connection, and a RTC vacuum controller (Reichelt Chemietechnik GmbH & Co., Heidelberg, Catalogue No. 95412).

A solution of 220.20 g acrylamide, 190.02 g water and 119.44 g acrylic acid was neutralized and adjusted to pH 7.8 by the addition of 204.77 g 45% caustic potash.

35.39 g sorbitane monoisostereate were dissolved in a beaker in 216.47 g iospar M (Esso TM; isoparaffin hydrocarbon mixture with a boiling range of 204°-247° and a density of 0.786 g/cm³ at 12° C.) to form the hydrophobic phase. The water-in-oil emulsion was formed by pouring the aqueous monomer solution (concentration 54.8%) into the hydrophobic phase whilst stirring. The emulsion was homogenized with a mixing rod (Krups TM -3-Mix) for 60 seconds whereupon it displayed a viscosity of 4.560 mPa.S.

After the addition of 0.34 g 2.2'-azoisobutyro dinitrile the emulsion was added to the reaction vessel and rinsed for 30 minutes with nitrogen whilst being stirred. Next, the emulsion was heated slowly in a bath, stirring speed 300 rpm, and the pressure in the vessel was adjusted to 55 mbar by connection to a water-jet pump through the RTC controller. After a brief period the emulsion was heated to 48° C. and polymerisation began, which is recognizable at the start of distillation. At 58° C. the bath was removed and the reaction mixture isolated. The progress of the polymerisation can be seen from the data shown in the following table.

| Time (Min) | Temp. (°C.) | Bath Temp. (°C.) | Pressure (mbar) | |
|---|---|---|---|---|
| 0 | 36,0 | 65 | 55 | |
| 2 | 40,0 | 64 | ↓ | Batch begins to boil; start of distillation |
| 7 | 46,0 | 61 | ↓ | |
| 13 | 48,0 | 58 | ↓ | |
| 15 | 48,0 | isolated | 55 | |
| 18 | 46,0 | " | 50 | |

-continued

| Time (Min) | Temp. (°C.) | Bath Temp. (°C.) | Pressure (mbar) | |
|---|---|---|---|---|
| 21 | 47,0 | " | ↓ | |
| 28 | 49,0 | " | ↓ | |
| 34 | 47,0 | " | ↓ | |
| 38 | 46,0 | " | 50 | |
| 41 | 50,0 | " | 45 | |
| 43 | 48,0 | " | ↓ | |
| 51 | 47,0 | " | ↓ | End of distillation |
| 55 | 48,0 | " | ↓ | |
| 62 | 48,0 | " | 45 | |
| 72 | 48,0 | " | 50 | |
| 77 | 47,5 | " | 50 | |
| 83 | 46,5 | " | 45 | |
| 105 | 44,0 | " | ventilated | |

Once the reaction has ceased, the reaction vessel is ventilated and the polymer dispersion is drawn off. 171.0 g distillate is obtained during polymerisation.

The polymer dispersion has a viscosity of 2.000 mPa.S. The 0.5-% solution (relative to polymer) obtained with the use of a wetting agent, e.g., nonylphenol-9 EO has a viscosity of 8.700 mPa.S. The product is effective as a flocculating agent in aqueous heavy liquids that contain solids. For purposes of description the flocculating behaviour and the sedimentation can be determined in a sample liquid.

To this end, a 250-ml test cylinder (diameter 50 mm) was filled with a clay slurry (Stammberge I) produced by the intensive mixing of 20 g blue clay from the Witterschlick mine (near Bonn) and one liter of water. The liquid was stirred with a simple angled rod stirrer at 300 rpm and a solution of the polymer was added by pipette in ppm-quantities. After the stirring machine had been stopped the time taken for the surface of the flocculant bed to fall from the 250 ml marking to the 170 ml marking of the test cylinder was measured in seconds. Time so measured is quoted as the flocculating value.

In order to test the cationic polyelectrolytes, 1.25 ml of a 20-% solution of $Al_2(SO_4)_3.18H_2O$ (Stammberge II) was added to the clay slurry in the test cylinder. (The flocculating values for Stammberge I (Witterschlick clay), determined from a 0.01-% solution are as follows at 1 ppm 3.5 seconds,
at 0.5 ppm 7.3 seconds)

The polymer content of the dispersion amounts to 49.3%, and the water content, 19.8%.

EXAMPLE 2

Production is carried on using the same apparatus as in example 1.

The aqueous monomer solution is produced from 336.56 g water, 337.44 g acrylamide and 311.72 g of an 80-% aqueous solution of acrylic acid-trimethylammonium ethylester chloride and adjusted to pH 4.4 with 6.5 ml 30-% hydrochloric acid. The hydrophobic phase was obtained by mixing 14.0 g sorbitane monoisostereate and 396.0 g isopar M (Esso).

The water-in-oil emulsion was formed by adding the aqueous solution to the hydrophobic phase, which was homogenized for 60 seconds with a Krups-3 mixer and adjusted to a viscosity of 840 mPa.S. 1.240 g of the emulsion added to the reaction vessel together with 0.3 g 2,2'-azoisobutyro dinitrile and freed of atmospheric oxygen by connection to water-jet pump whilst being stirred at 250 rpm for 20 minutes. The pressure in the reaction vessel at the beginning of polymerisation was adjusted to 70 mbar through the RTC vacuum controller and the reaction was started by the addition of 0.23 ml of a 0.5-% sodium dithionite solution. The temperature and pressure values that occurred during the course of polymerisation can be seen in the table.

| Time (Min) | Temp. (°C.) | Pressure (mbar) | |
|---|---|---|---|
| 0 | 23 | 70 | +0,23 ml 0,5% $Na_2S_2O_4$ in water |
| 4 | 34,5 | 44 | |
| 18 | 37,5 | 64 | |
| 27 | 40 | 64 | |
| 34 | 44,5 | 64 | Start of distillation |
| 46 | 44,5 | 64 | |
| 66 | 44 | 62 | |
| 81 | 41,5 | 59 | |
| 114 | 43 | 58 | approx. 80 ml distillate |
| 125 | 50 | 1.000 | ventilated with $N_2$ |
| 132 | 58,5 | 1.000 | |
| 145 | 70,5 | 1.000 | end of polymerisation |

The distillation phase begins at 44.5° C. and 64 mbar; once approximately 80 ml of distillate have been obtained, the pressure is raised through the RTC vacuum controller and polymerisation is carried on adiabatically under a temperature increase up to 70.5° C. until the end. The polymer dispersion is then cooled by renewed distillation at 50 mbar. Altogether, 121.0 g distillate was separated off. 11.2 g of a 20-% aqueous solution of sodium dithionite was added to the polymer dispersion while stirring and then 11.2 g of a $C_{12}$–$C_{18}$ fatty alcohol-5-EO oxethylate was added. The product has a viscosity of 2.200 mPa.S. The 1-% solution (relative to the polymer fraction) in completely desalinated water has a viscosity of 3.800 mPa.S. (Flocculation value in Stammberge II (Witterschlick clay) determined from a 0.1-% solution amounts to 3.4 seconds at an addition of 2 ppm).

The polymer content of the dispersion amounts to 45.7%, and the water content amounts to 20.4%.

EXAMPLE 3

Production is carried on with the same apparatus as example 1. The aqueous monomer solution is produced from 193.2 g water, 207.0 g acrylic acid, 179.7 g 25-% ammonia, 0.045 g methylenebisacrylamide and 0.13 g 2,2'-azo-bis-(2-amidinopropane) hydrochloride. The pH value of the solution was adjusted to 5.84.

The hydrophobic phase was formed by mixing 200.1 g of an isoparaffinic hydrocarbon mixture (boiling range 204°–247° C.) with 17.3 g sorbitane monoisostereate.

The water-in-oil emulsion is formed by adding the aqueous monomer solution to the hydrophobic phase while stirring and this was homogenized for 20 seconds with a Krupps-3 mixer and adjusted to a viscosity of 1400 mPa.S.

780 g of the monomer emulsion were added to the reaction vessel and whilst being stirred (250 rpm) were freed of oxygen for 20 minutes by connection to a water-jet pump. At the beginning of polymerisation pressure in the reaction vessel was adjusted through the RTC vacuum controller to 70 mbar and the water-in-oil emulsion was heated to 42° C. After this the reaction vessel was isolated.

The temperature and pressure values during the polymerisation process are seen in the following table.

| Time (Min.) | Temp. (°C.) | Pressure (mbar) | |
|---|---|---|---|
| 0 | 21 | 70 | |
| 9 | 42 | | Isolation without heating |
| 10 | 42 | | Start of distillation |
| 20 | 44 | | |
| 23 | 45 | | |
| 24 | 45,5 | 78 | |
| 66 | 44,5 | 70 | approx. 45 ml distillate |
| 79 | 60 | | |
| 85 | 74 | | |
| 126 | 78,5 | | |
| 134 | 78,0 | 70 | |

The emulsion polymer was cooled to 30° C. by distilling off the water. Altogether, a total of 80 g was separated off as distillate.

3.0 g ethoxylated monylphenol and 3.0 g 25-% ammonia were added during stirring. The polymer content of the homogeneous dispersion amounted to 33.7%.

On the addition of 0.5% polymer to water viscosity increased to 4600 mPa.S.

The embodiments of the invention in which an exclusive property or privilege is claimed are defined as follows:

1. In the production of a concentrated emulsion polymer that is water-soluble or that swells in water, comprising polymerising at least one water-soluble monomer in a water-oil dispersion employing a polymerisation initiator, optionally in the presence of a bi- or multifunctional vinyl or allyl compound, the improvement which comprises effecting the polymerisation by stirring a water-in-oil dispersion containing all the starting monomers and removing the polymerisation heat by distilling off water contained in the reaction mixture.

2. A process according to claim 1, wherein the polymerisation temperature is adjusted by means of system pressure.

3. A process according to claim 1, wherein the system pressure is regulated so that the polymerisation temperature is maintained in the range of 20°–70° C.

4. A process according to claim 14, wherein the system pressure is regulated so that the polymerisation temperature is maintained in the range of 30°–50° C.

5. A process according to claim 14, wherein polymerisation is carried out at a pressure of 10–150 mbar.

6. A. process according to claim 1, wherein the polymerisation is carried on under conditions which are at least approximately isothermic.

7. A process according to claim 1, wherein the polymerisation is carried on in a first phase up to a monomer yield of up to 60%, relative to the total quantity of monomers, in the range from 30°–50° C., and then the polymerisation of the still existing monomers is completed almost isothermically at 50°–70° C., or under adiabatic conditions.

* * * * *

UNITED STATES PATENT AND TRADEMARK OFFICE
CERTIFICATE OF CORRECTION

PATENT NO. : 4,925,884

DATED : May 15, 1990

INVENTOR(S) : Wolfgang Hübner, et al

It is certified that error appears in the above-identified patent and that said Letters Patent is hereby corrected as shown below:

Col. 8, line 46     Delete "14" and substitute --1--

Col. 8, line 49     Delete "14" and substitute --1--

Signed and Sealed this

Twenty-eighth Day of July, 1992

Attest:

DOUGLAS B. COMER

*Attesting Officer*     *Acting Commissioner of Patents and Trademarks*